United States Patent [19]

Biscar

[11] 3,717,031
[45] Feb. 20, 1973

[54] THREE ELECTRODE FLOW METER
[75] Inventor: Jean P. Biscar, Laramie, Wyo.
[73] Assignee: The Regents of the University of California, Berkeley, Calif.
[22] Filed: Feb. 22, 1971
[21] Appl. No.: 117,478

[52] U.S. Cl. ........................ 73/194 EM, 128/2.05 F
[51] Int. Cl. .......................... G01f 1/00, A61b 5/02
[58] Field of Search ............. 73/194 EM; 128/2.05 F

[56] References Cited

UNITED STATES PATENTS

| 3,487,826 | 1/1970 | Barefoot | 73/194 EM UX |
| 3,316,762 | 5/1967 | Westersten | 73/194 EM |
| 3,449,951 | 6/1969 | Westersten | 73/194 EM |

Primary Examiner—Charles A. Ruehl
Attorney—Jessup & Beecher

[57] ABSTRACT

An improved electromagnetic flow meter is provided which includes means for nulling out the transformer or quadrature electromotive force which is independent of fluid flow and which is in quadrature phase with the useful flow signal. This nulling is achieved by juxtaposing to one of the electrodes of the flow meter a pair of electrodes (instead of a single electrode as is standard practice). This electrode pair is connected to the end points of an external potentiometer, and the wiper is connected to one of the amplifier input terminals. By adjusting the wiper position, a zero signal may be obtained from the amplifier at zero flow. External circuitry may also be provided for a manual or servo controlled fine adjustment of the quadrature electromotive force compensation.

4 Claims, 7 Drawing Figures

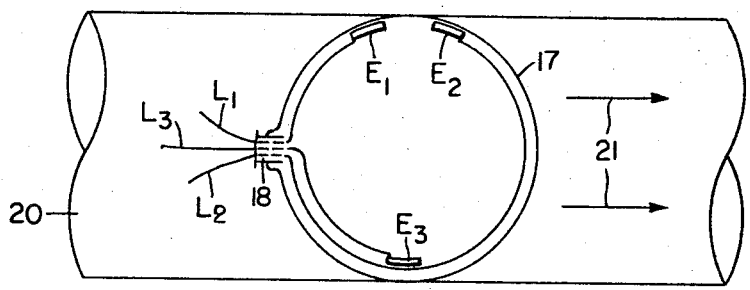
Fig.1
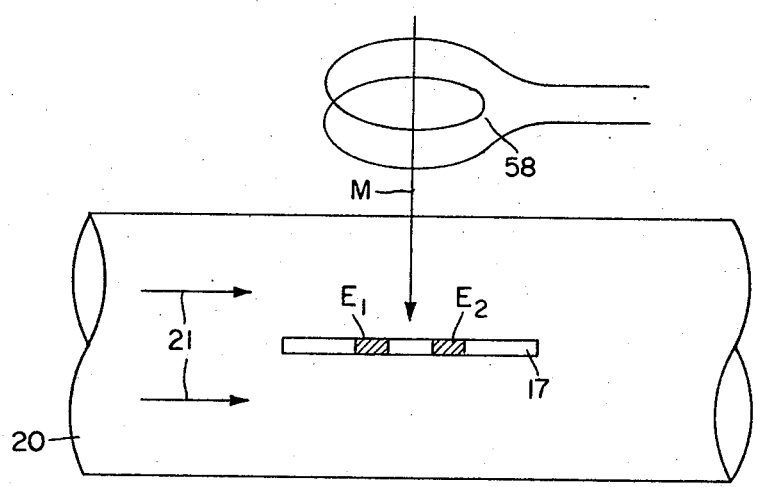
Fig.2A
Fig.2B
Fig.2C
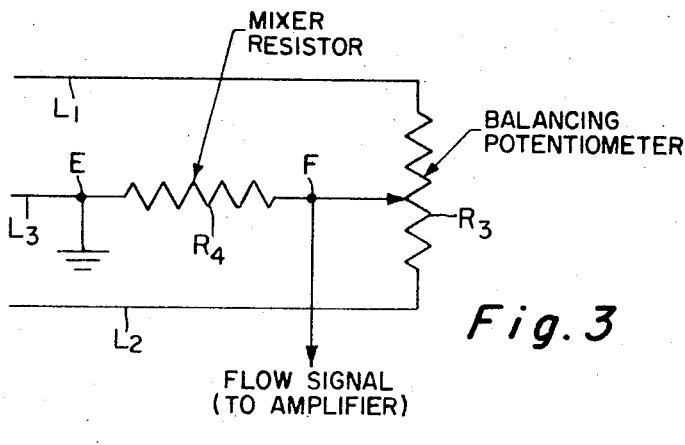
Fig.3

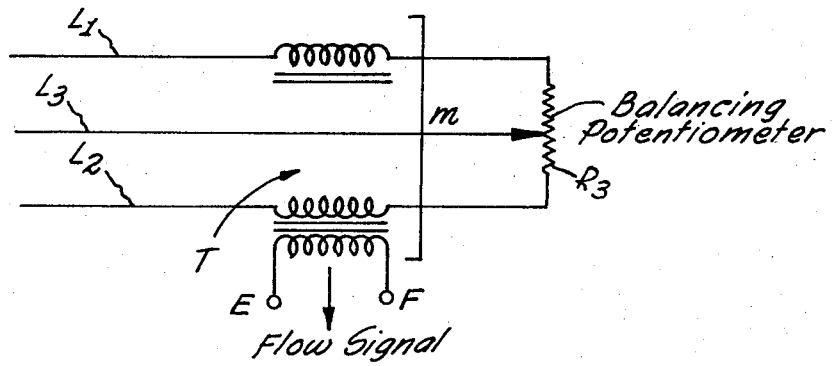
Fig. 4 (Transformer Mixer)
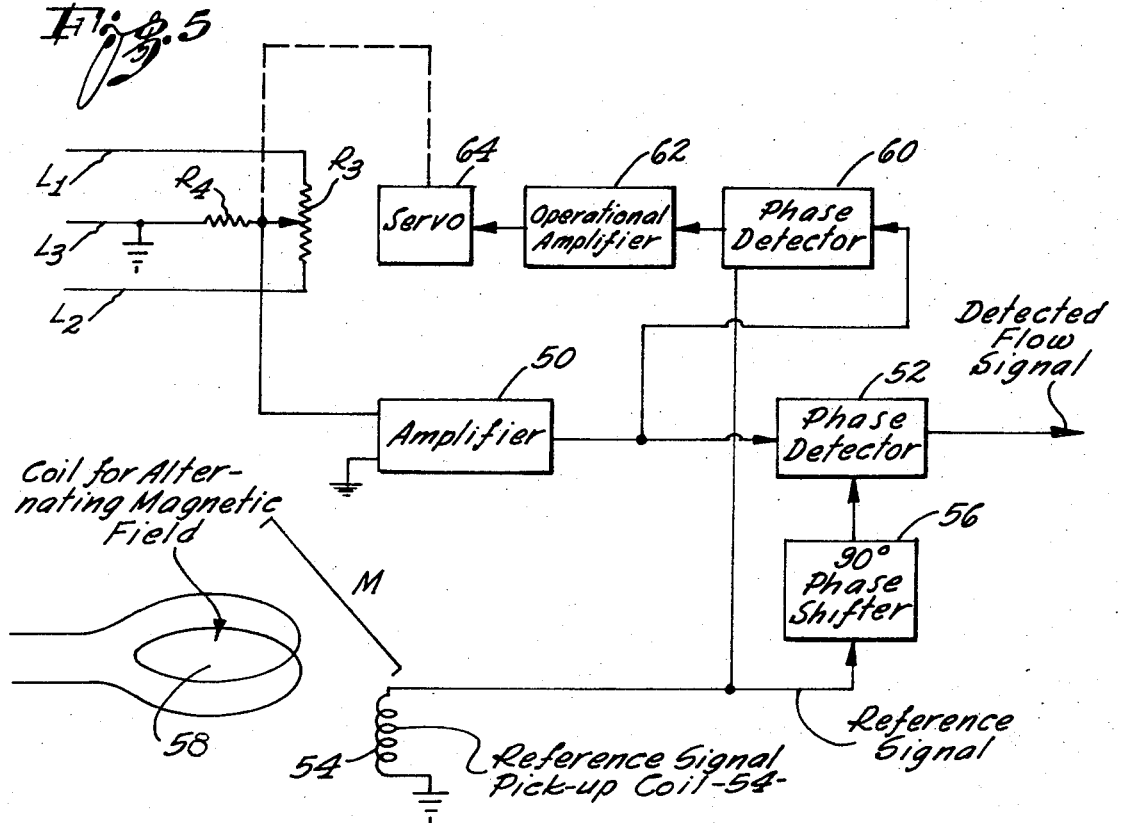
Fig. 5

THREE ELECTRODE FLOW METER

BACKGROUND OF THE INVENTION

The volume rate of blood flow can be determined quantitatively by an electromagnetic flow meter applied externally to a blood vessel. Such an application, however, requires surgical exposure of the blood vessel and often involves extensive surgery. This is clearly undesirable, if routine use is to be made of electromagnetic flow meters for clinical measurement of blood flow in patients.

In order to overcome the limitations of the prior art electromagnetic flow meters, catheter type electromagnetic flow meters have been developed which comprise an electromagnetic flow transducer incorporated into a thin flexible catheter type tube, and which may be inserted through a branch vessel, such as the femoral artery or jugular vein, and from where it may be maneuvered into a major artery, such as the aorta or pulmonary artery, or vein, such as the vena cava. C. J. Mills, Phys. Med. Biol. 11, 323, (1966)

As is well known, the usual prior art electromagnetic flow meter includes appropriate means for producing a magnetic field across the path of the moving liquid, such as the blood in the blood vessel, so that the liquid is caused to generate a voltage as it moves through the magnetic field, with the voltage being directly proportional to the velocity of the liquid. The electrodes, which are displaced on opposite sides of the conduit carrying the liquid, such as the blood vessel, develop a signal which is representative of the liquid flow velocity, and which shall be designated herein as the flow signal.

However, as is well known, a quadrature voltage is also developed in most electromagnetic flow meters of the type under consideration. This quadrature voltage has no relation to the fluid flow in the blood vessel, and it has a tendency to cause errors in the resulting measurements of the fluid flow. In the past, somewhat elaborate phase sensitive detector means have been provided in an attempt to detect the flow signal independently of the aforesaid quadrature voltage.

The present invention is essentially a modification of the system described by A. Kolin in Proc. Natl. Ac. of Sc., Vol 63, No. 2, pp 357–363, June 1969. It utilizes the same basic structure of a resilient, collapsible frame, but differs in providing an alternate to the method, shown on page 362 of the aforesaid reference, for nulling out undesired quadrature EMF's.

The electromagnetic flow meter of the present invention includes an additional (third) electrode, and circuitry is connected to the additional electrode in which the quadrature voltage may be cancelled, as mentioned above, by an adjustment of electronic, magnetic or electrical means, such as external adjustment circuitry for fine adjustment. The external circuitry may be manually or automatically controlled to bring the resultant transfer voltage essentially to zero, and to maintain, the transfer voltage at the zero level.

BRIEF DESCRIPTION OF THE DRAWINGS

FIG. 1 is a schematic representation of an electromagnetic intraluminal flow meter pick up or sensor constructed in accordance with the concepts of the invention;

FIG. 2, consisting of FIGS. 2A, 2B, and 2C, illustrates the orientation of the sensor in the flow conduit or lumen. FIG. 2A is a side elevation; FIG. 2B is a top plan; FIG. 2C is a cross section.

FIG. 3 is a fragmentary circuit diagram in which a balancing potentiometer is used for balancing the quadrature voltages so as to derive a resultant zero quadrature voltage, and also including a resistance type mixer across which the flow signal is achieved;

FIG. 4 is a fragmentary circuit diagram like FIG. 3, but which includes magnetic rather than resistance means as the mixer; and FIG. 5 is a schematic diagram partly in circuit detail and partly in block form showing an external servo control for automatically maintaining the aforesaid quadrature voltage at a zero resultant state.

DETAILED DESCRIPTION OF THE ILLUSTRATED EMBODIMENT

The electromagnetic flow meter of the invention as shown in FIG. 1 includes a transducer or sensor portion, which may, for example, be in the form of a resilient wire-like loop frame 17, like the above mentioned Kolin system. The ends of the resilient frame 17 are welded or otherwise affixed to a feeder tube 18.

Three electrodes $E_1$, $E_2$, and $E_3$ are attached to the frame 17, and electrical contact may be made to these electrodes by separate leads $L_1$, $L_2$ and $L_3$ connected thereto. The leads $L_1$, $L_2$ and $L_3$ extend through the tube 18. The electrodes $E_1$ and $E_2$ are mounted on the frame 17 to be disposed on one side of the fluid flowing through the lumen or conduit 20, for example, and the electrode $E_3$ is mounted on the opposite side of the frame 17 to be disposed on the other side of the fluid flow 21 in the conduit. An external magnetic means 58 (FIGS. 2A and 5) may be provided for creating the required magnetic field M within the conduit. "A new approach to electromagnetic blood flow determination by means of catheter in an external magnetic field." by Alexander Kolin, Proc. Natl. Ac. Sci., Vol. 65, pp 521–527, March 1970. Also note A. Kolin, Proc. Natl. Ac. of Sci., Vol 63, No. 2 pp 357–363, June 1969.

The flow of fluid in the conduit through the magnetic field causes an electromotive force to be developed, and this electromotive force is detected by the potential difference between the electrodes $E_1$ and $E_3$, and also by the potential difference between the electrodes $E_2$ and $E_3$. It is usual for the magnetic field to be made alternating, so that the resulting flow signals appearing across the electrodes $E_1$ and $E_3$ and $E_2$ and $E_3$ are likewise alternating.

In the embodiment of FIG. 1, the leads $L_1$, $L_2$ and $L_3$ are brought externally, so that they may be connected into appropriate electric circuits, which will be described. These circuits include, for example, balancing impedances across which the aforesaid quadrature voltages appear in opposite phase and are cancelled, and the resulting flow signals may appear across a mixing impedance or load.

The resilient frame 17 may take any appropriate shape, for example, it may be circular as shown in FIGS. 1 and 2 or lens shaped as in the aforementioned Kolin system.

The leads $L_1$, $L_2$ and $L_3$ in the embodiment of FIG. 1 are connected to the circuit shown in FIG. 3. The circuit of FIG. 3 includes a balancing potentiometer $R_3$ connected to the leads $L_1$, $L_2$, whereas the flow signal is taken across the terminals E-F, connected respectively to the lead $L_3$ and to the movable contact of the potentiometer. The mixer resistor $R_4$ thus constitutes the load on the circuit, and the output is taken between point E which may for example be grounded, and point F, which preferably is led to an amplifier. The potentiometer may be adjusted by any appropriate means, either electronic or mechanical, in order to provide a balance between the oppositely phased quadrature voltages. The flow signal thus appears across the mixer resistor $R_4$.

The circuit of FIG. 3 has been used in a constructed embodiment of the invention in which, for example, the balancing potentiometer $R_3$ had a resistance to 50 ohms, and the mixer resistor $R_4$ had a resistance of 10 kilohms. The circuit of FIG. 3 was used in conjunction with the instrument shown in FIG. 1 in the constructed embodiment, in which a quadrature electromotive force of the order of 1.5 millivolts was developed. This quadrature electromotive force was reduced, in accordance with known techniques, by physical adjustment of the common electrode $E_3$, down to a level of the order of 20–50 microvolts. Then, by additional balancing thru adjustment of the potentiometer $R_3$, the quadrature electromotive force was compensated to a level below 1 microvolt.

As shown in the embodiment of FIG. 4, the mixer resistor $R_4$ may be replaced by a transformer T, the transformer including primary windings respectively included in the circuit between the potentiometer $R_3$ and the respective leads $L_1$ and $L_2$. The flow signal is derived across the secondary of the transformer T, that is, across the terminals E and F.

It will be appreciated that although resistance mixing means is used in the circuit of FIG. 3, and inductive mixing means is used in the circuit of FIG. 4, the flow signal mixing may occur in the load itself, and may take the form, for example, of an appropriate electronic circuit.

The circuit of FIG. 3 is shown as being manually adjustable. However, the circuit may be included in a control system, such as the system of FIG. 5, so that appropriate servo means may be used to maintain the compensated quadrature voltage at a minimum level. In the system of FIG. 5, for example, the flow signal is amplified in an amplifier 50, and the resulting amplified flow signal is detected in a phase detector 52.

The phase detector 52 is excited, for example, by a reference signal derived across a reference signal pick-up coil 54 and shifted 90° by a phase shifter circuit 56. The pick-up coil 54 is inductively coupled, for example, to the coil 58 which is used to generate the alternating magnetic field M which is caused to pass through the blood vessel 20 or other conduit in which the flow meter is used, so as to establish the magnetic field which produces the aforesaid voltages in the flow meter.

Any residual quadrature EMF is detected in a phase detector 60, the latter phase detector being excited directly by the reference signal derived from the pick-up coil 54. The output of the phase detector 60 is amplified in an operational amplifier 62 and applied to an appropriate servo system 64. The servo system 64 controls the movable tap of the potentiometer $R_3$, and always tends to move that tap to a position such that the residual quadrature EMF from the amplifier 50 is maintained at a minimum level.

An improved electromagnetic flow meter is provided, therefore, which is constructed so that the quadrature EMF is self-compensated within the instrument itself, and which may include further electrical or electronic circuitry for providing a control, either manual or automatic, to reduce the quadrature EMF essentially to zero, and to maintain the quadrature EMF essentially at the zero level.

It will be appreciated that while particular embodiments of the invention have been shown and described, modifications may be made. It is intended to cover all such modifications which come within the scope of the invention in the following claims.

What is claimed is:

1. A self-compensating sensor for an electromagnetic flow meter to be located in a conduit to measure fluid flow therein; comprising:
   frame means locatable in said conduit;
   a common electrode mounted on one side of said frame means;
   a pair of electrodes mounted on the other side of said frame means across said conduit from said common electrode;
   external circuit means including a first conductor extending around said frame to said common electrode and connected thereto, a pair of conductors extending around said frame to respective ones of said pair of electrodes and respectively connected thereto, a balancing potentiometer connected across said pair of conductors, and signal mixer means connected between said first conductor and a movable tap on said potentiometer, whereby said sensor develops a flow signal between each of said pair of electrodes and said common electrode which is sensed by said signal mixer means, and also develops a pair of oppositely phased electromotive forces between said common electrode and respective ones of said pair of electrodes which are balanced out by adjustment of said movable tap on said balancing potentiometer.

2. The combination defined in claim 1, in which said signal mixer means comprises a resistor.

3. The combination defined in claim 1, in which said signal mixer means comprises a transformer.

4. The combination defined in claim 1, and which includes servo control means mechanically connected to the aforesaid movable tap on said potentiometer to maintain said tap in a position resulting in essentially zero quadrature electromotive force across said signal mixer means.

* * * * *